United States Patent
Richter et al.

(10) Patent No.: US 11,046,302 B2
(45) Date of Patent: Jun. 29, 2021

(54) ON-VEHICLE CHARACTERIZATION OF PRIMARY ENGINE WITH COMMUNICATION INTERFACE FOR CROWDSOURCED ADAPTATION OF ELECTRIC DRIVE CONTROLLERS

(71) Applicant: HYLIION INC., Cedar Park, TX (US)

(72) Inventors: Roger Richter, Leander, TX (US);
Jamie Noland, Pittsburgh, PA (US);
Morgan Culbertson, Shadyside, PA (US)

(73) Assignee: Hyliion Inc., Cedar Park, TX (US)

( * ) Notice: Subject to any disclaimer, the term of this patent is extended or adjusted under 35 U.S.C. 154(b) by 184 days.

(21) Appl. No.: 16/237,078

(22) Filed: Dec. 31, 2018

(65) Prior Publication Data

US 2019/0202431 A1 Jul. 4, 2019

Related U.S. Application Data

(60) Provisional application No. 62/612,561, filed on Dec. 31, 2017.

(51) Int. Cl.
*B60W 20/12* (2016.01)
*B60W 10/08* (2006.01)
*B60W 20/13* (2016.01)

(52) U.S. Cl.
CPC ............ *B60W 20/12* (2016.01); *B60W 10/08* (2013.01); *B60W 20/13* (2016.01)

(58) Field of Classification Search
CPC ...... B60W 20/12; B60W 10/08; B60W 20/13; B60W 2556/05; B60W 2050/0077;
(Continued)

(56) References Cited

U.S. PATENT DOCUMENTS

| 4,199,037 A | 4/1980 | White |
| 5,488,352 A | 1/1996 | Jasper |

(Continued)

FOREIGN PATENT DOCUMENTS

| CA | 2457216 A1 | 8/2004 |
| CN | 106004865 A | 10/2016 |

(Continued)

OTHER PUBLICATIONS

PCT International Search Report and Written Opinion for counterpart application dated Mar. 27, 2019 for PCT/US2018/068113 filed Dec. 31, 2018.

(Continued)

*Primary Examiner* — Peter D Nolan
*Assistant Examiner* — Ashley L Redhead, Jr.
(74) *Attorney, Agent, or Firm* — Baker Botts L.L.P.

(57) ABSTRACT

Through-the-road (TTR) hybrid designs using control strategies such as an equivalent consumption minimization strategy (ECMS) or adaptive ECMS are implemented at the supplemental torque delivering electrically-powered drive axle (or axles) in a manner that follows operational parameters or computationally estimates states of the primary drivetrain and/or fuel-fed engine, but does not itself participate in control of the fuel-fed engine or primary drivetrain. Crowdsourced distributions of adaptations and/or selections of BSFC type data allow ECMS implementations (or other similar control strategies) employ efficiency curves for a particular paired-with fuel-fed engine and/or operating conditions and to improve overall efficiencies of the TTR hybrid configuration. In some cases, signatures are used to identify appropriate BSFC type data for crowdsourced dissemination.

21 Claims, 8 Drawing Sheets

(58) Field of Classification Search
CPC .. B60W 2556/50; B60W 20/11; B60W 10/06; B60K 6/48; B60K 6/52; G07C 5/008
See application file for complete search history.

(56) References Cited

U.S. PATENT DOCUMENTS

| | | | |
|---|---|---|---|
| 5,559,420 | A | 9/1996 | Kohchi |
| 6,390,215 | B1 | 5/2002 | Kodama |
| 6,516,925 | B1 | 2/2003 | Napier |
| 7,147,070 | B2 | 12/2006 | Leclerc |
| 7,338,335 | B1 | 3/2008 | Messano |
| 8,327,960 | B2 | 12/2012 | Couture |
| 8,627,908 | B2 | 1/2014 | Wellborn |
| 9,321,357 | B2 | 4/2016 | Caldeira |
| 9,457,666 | B2 | 10/2016 | Caldeira |
| 9,887,570 | B2 | 2/2018 | Johnsen |
| 9,937,819 | B2 | 4/2018 | Healy |
| 9,948,136 | B2 | 4/2018 | Doane |
| 2002/0038730 | A1 | 4/2002 | Bidwell |
| 2002/0056579 | A1 | 5/2002 | Cooper |
| 2004/0002794 | A1 | 1/2004 | Pillar |
| 2005/0045058 | A1 | 3/2005 | Donnelly |
| 2005/0060079 | A1 | 3/2005 | Phillips |
| 2007/0193795 | A1 | 8/2007 | Forsyth |
| 2008/0169144 | A1 | 7/2008 | DeGrave |
| 2008/0174174 | A1 | 7/2008 | Burns |
| 2009/0223725 | A1 | 9/2009 | Rodriguez |
| 2010/0065344 | A1* | 3/2010 | Collings, III ........... B60L 50/20 180/2.1 |
| 2010/0141201 | A1 | 6/2010 | Littrell |
| 2010/0224430 | A1 | 9/2010 | Bennett, Sr. |
| 2010/0252339 | A1 | 10/2010 | Bibeau |
| 2010/0282122 | A1 | 11/2010 | Mai |
| 2011/0042154 | A1 | 2/2011 | Bartel |
| 2011/0094807 | A1 | 4/2011 | Pruitt |
| 2011/0320078 | A1 | 12/2011 | McGill |
| 2012/0167555 | A1 | 7/2012 | Frazier |
| 2013/0041621 | A1* | 2/2013 | Smith ................... B60K 35/00 702/142 |
| 2013/0190998 | A1 | 7/2013 | Polimeno |
| 2013/0204501 | A1 | 8/2013 | Keeney |
| 2013/0338848 | A1 | 12/2013 | Park |
| 2014/0025245 | A1 | 1/2014 | Fanourakis |
| 2014/0116077 | A1 | 5/2014 | Pierce et al. |
| 2015/0073639 | A1* | 3/2015 | Minarcin .............. B60W 40/04 701/22 |
| 2015/0204741 | A1 | 7/2015 | Hagan |
| 2015/0298680 | A1 | 10/2015 | Matthews |
| 2015/0298684 | A1 | 10/2015 | Schwartz |
| 2015/0330503 | A1* | 11/2015 | Sujan .................... F16H 61/02 701/55 |
| 2015/0345621 | A1* | 12/2015 | Sujan ................. F16H 61/0213 701/58 |
| 2016/0014252 | A1 | 1/2016 | Biderman |
| 2016/0031428 | A1* | 2/2016 | Sun ....................... B60W 10/26 701/22 |
| 2016/0031435 | A1 | 2/2016 | O'Connor Gibson |
| 2016/0061611 | A1 | 3/2016 | Meyer |
| 2016/0137204 | A1 | 5/2016 | Morselli |
| 2016/0318421 | A1 | 11/2016 | Healy |

FOREIGN PATENT DOCUMENTS

| | | |
|---|---|---|
| EP | 2985170 A2 | 2/2016 |
| WO | WO 2005012025 A1 | 2/2005 |
| WO | WO 2015052567 | 4/2015 |
| WO | WO 2015/140244 A1 | 9/2015 |
| WO | WO 2017/095425 A1 | 6/2017 |
| WO | WO 2018064619 A2 | 4/2018 |

OTHER PUBLICATIONS

Hosein Sagha, Shahrokh Farhangi, Behzad Asaei, "Modeling and Design of a NOx Emission Reduction Strategy for Lightweight Hybrid Electric Vehicles", Published in $35^{th}$ Annual Conference of IEEE Industrial Electronics, Nov. 3-5, 2009, IEEE (c) 2009, pp. 334-339.

Zulkifli, S.A.: "Split-Parallel Through-the-Road Hybrid Electric Vehicle: Operation, Power Flow and Control Modes", 2015 IEEE Transportation Electrification Conference and Expo (ITEC), Jun. 17, 2015 (Jun. 17, 2015), pp. 107.

PCT International Search Report, Application No. PCT/US2017/054587, dated Apr. 20, 2018.

PCT International Search Report, Application No. PCT/US2018/018499, dated May 22, 2018.

European Search Report, Application No. 16789915.2, dated Jan. 8, 2018.

Karbowski, Sokolov, and Rousseau, "Vehicle Energy Management Optimisation through Digital Maps and Connectivity", 22nd ITS World Congress, ITS-1952, Bordeaux, France, Oct. 5-9, 2015.

Lin, Kang, and Peng, "Energy Management Strategy for a Parallel Hybrid Electric Truck", Proceedings of the American Control Conference, 2001, pp. 2878-2883, Digital Object Identifier: 10.1109/ACC.2001.946337.

Zulkifli, Mohd, Saad, and Aziz, "Operation and Control of Split-Parallel, Through-The-Road Hybrid Electric Vehicle With In-Wheel Motors", International Journal of Automotive and Mechanical Engineering, vol. 11, pp. 2793-2808, 2015, Digital Object Identifier: 10.15282/ijame.11.2015.54.0235.

Kural and Guvenc, "Predictive-Equivalent Consumption Minimization Strategy for Energy Management of a Parallel Hybrid Vehicle for Optimal Recuperation", Journal of Polytechnic, 18(3), pp. 113-124, 2015, Digital Object Identifier: 10.2339/2015.18.3, 113-124.

Skugor, Pavkovic, and Deur, "A Series-Parallel Hybrid Electric Vehicle Control Strategy Including Instantaneous Optimization of Equivalent Fuel Consumption", IEEE International Conference on Control Applications, pp. 310-316, 2012.

PCT International Search Report and Written Opinion, Application No. PCT/US2016/030482, dated Aug. 4, 2016.

Musardo, Rizzoni, and Staccia, "A-ECMS: An Adaptive Algorithm for Hybrid Electric Vehicle Energy Management", Proceedings of the 44th IEEE Conference on Decision and Control, 2005, pp. 1816-1823.

Paganelli, Delprat, Guerra, Rimaux, and Santin, "Equivalent Consumption Minimization Strategy for Parallel Hybrid Powertrains", Proceedings of the IEEE 55th Vehicular Technology Conference, 2002, pp. 2076-2081.

Sciarretta, Back, and Guzzella, "Optimal Control of Parallel Hybrid Electric Vehicles", IEEE Transactions on Control Systems Technology, vol. 12, No. 3, pp. 352-363, May 2004.

Sciarretta and Guzzella, "Control of Hybrid Electric Vehicles", IEEE Control Systems Magazine, vol. 27, No. 2, pp. 60-70, Apr. 2007.

* cited by examiner

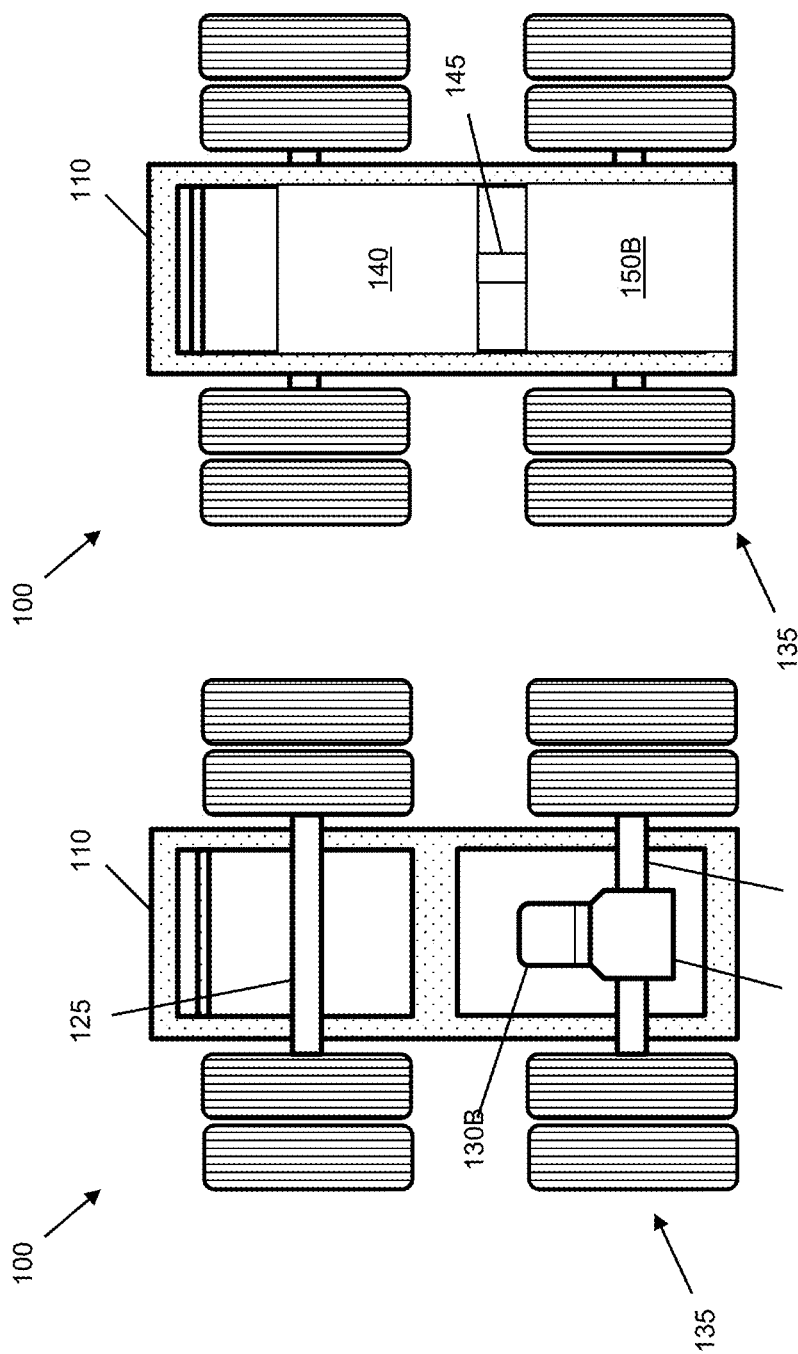

ON-VEHICLE CHARACTERIZATION OF PRIMARY ENGINE WITH COMMUNICATION INTERFACE FOR CROWDSOURCED ADAPTATION OF ELECTRIC DRIVE CONTROLLERS

RELATED APPLICATIONS

The present application claims priority of U.S. Provisional Application No. 62/612,561, filed Dec. 31, 2017.

The present application is also related to (i) U.S. application Ser. No. 15/721,345, filed Sep. 29, 2017, entitled "VEHICLE ENERGY MANAGEMENT SYSTEM AND RELATED METHODS", (ii) U.S. application Ser. No. 16/237,032, filed Dec. 31, 2018, entitled "SUPPLEMENTAL ELECTRIC DRIVE WITH PRIMARY ENGINE RECOGNITION FOR ELECTRIC DRIVE CONTROLLER ADAPTATION", and (iii) U.S. application Ser. No. 16/237,064, filed Dec. 31, 2018, entitled "ELECTRIC DRIVE CONTROLLER ADAPTATION TO THROUGH-THE-ROAD (TTR) COUPLED PRIMARY ENGINE AND/OR OPERATING CONDITIONS". Each of the foregoing applications is incorporated herein by reference.

BACKGROUND

Field of the Invention

The invention relates generally to hybrid vehicle technology and, in particular, to systems and methods to adapt control strategies for an electric drive axle to particular fuel-fed engine configurations with which the electric drive axle is paired in a through-the-road (TTR) hybrid configuration.

Description of the Related Art

The U.S. trucking industry consumes about 51 billion gallons of fuel per year, accounting for over 30% of overall industry operating costs. In addition, the trucking industry spends over $100 billion on fuel annually, and the average fuel economy of a tractor-trailer (e.g., an 18-wheeler) is only about 6.5 miles per gallon. For trucking fleets faced with large fuel costs, techniques for reducing those costs would be worth considering.

Hybrid technology has been in development for use in the trucking industry for some time, and some trucks that exploit multiple power sources have entered the market. However, existing systems are generally focused on hybridizing the primary engine and drivetrain of a heavy truck or tractor unit, while any "dead" axles on truck, tractor unit or attached trailer remain a passive load. Thus, the extent to which fuel efficiency of a trucking fleet may be improved using these technologies has been limited to the fuel efficiencies obtained from improvement of the primary engine and drivetrain itself and the in-fleet adoption of such technologies. As such, conventional applications of hybrid technologies generally presume a fixed pairing of fuel-fed and electrical power sources, wherein a unitary control strategy blends motive torque from the respective power sources and delivers one, the either or both through a unified drivetrain.

Given the large numbers of heavy trucks and tractor units already in service and their useful service lifetimes, the improved hybrid drivetrains that are candidates for introduction in new vehicles would only address a small fraction of existing fleets. Improved techniques, increased adoption and new functional capabilities are all desired. In particular, techniques that allow (i) the pairing of an electric drive axle (or axles) with a diverse set of fuel-fed engines that already exist and have been adopted in trucking fleets and (ii) the adaptation of through-the-road (TTR) control strategies such as an equivalent consumption minimization strategy (ECMS) or adaptive ECMS technique to the particular, paired-with fuel-fed engine are all desired.

SUMMARY AND DESCRIPTION

It has been discovered that a through the road (TTR) hybridization strategy can facilitate introduction of hybrid electric vehicle technology in a significant portion of current and expected trucking fleets. In some cases, the technologies can be retrofitted onto an existing vehicle (e.g., a truck, a tractor unit, a trailer, a tractor-trailer configuration, at a tandem, etc.). In some cases, the technologies can be built into new vehicles or added to new vehicles in an aftermarket channel. In some cases, one vehicle may be built or retrofitted to operate in tandem with another and provide the hybridization benefits contemplated herein. By supplementing motive forces delivered through a primary drivetrain and fuel-fed engine with supplemental torque delivered at one or more electrically-powered drive axles, improvements in overall fuel efficiency and performance may be delivered, typically without significant redesign of existing components and systems that have been proven in the trucking industry.

More specifically, in some embodiments of the present inventions, techniques are employed to recognize a primary fuel-fed engine with which an electrically-powered drive axle is paired and to adapt through-the-road (TTR) control strategies applied at the electrically-powered drive axle to characteristics of the particular, paired-with, fuel-fed engine. In some embodiments, a communication interface is used for retrieval of brake-specific fuel consumption (BSFC) data or the like for a recognized and paired-with fuel-fed engine. While the ability to adapt control strategies applied at the electrically-powered drive axle to the paired-with fuel-fed engine can be particularly advantageous in tractor-trailer configurations where an electrically-powered drive axle (e.g., on a trailer) is paired with an ever changing set of fuel-fed engines (e.g., on tractor), other configurations may also benefit. For example, even in fixed pairings (such as on a unitary vehicle or tractor configured with a 6×2 primary drivetrain and supplemental electric drive axle), the ability to retrieve BSFC type data for a particular, fuel-fed engine and adapt TTR control strategies applied at the electrically-powered drive axle facilitates applications where direct integration with engine controls is difficult, undesirable or ill-advised. In addition, in some embodiments, over-the-air (OTA) updates may be employed to adapt TTR control strategies based on crowdsourced insights for a particular engine/drive train configuration and/or in a manner particular to regional, route, terrain, climatic, weather, vehicle load or other factors.

In general, TTR designs using control strategies such as an equivalent consumption minimization strategy (ECMS) or an adaptive ECMS are contemplated and implemented at the supplemental torque delivering electrically-powered drive axle (or axles) in a manner that follows operational parameters or computationally estimates states of the primary drivetrain and/or fuel-fed engine, but does not itself participate in control of the fuel-fed engine or primary drivetrain. Although BSFC type data generic to a range of fuel-fed engines can be employed (at least initially), BSFC type data particular to the paired-with fuel-fed engine allows an ECMS implementation (or other similar control strategies) to adapt to efficiency curves for the particular fuel-fed engine and to improve overall efficiencies of the TTR hybrid configuration.

Crowdsourced Adaptation of Electric Drive Controllers

In some embodiments in accordance with the present inventions, method for crowdsourcing vehicle operating parameters, the method comprising: (i) at a network-connected service platform, receiving from at least some of a plurality of communicatively coupled vehicles, brake-specific fuel consumption (BSFC) type data used during over-the-road travel for a fuel-fed engine of the respective, received-from vehicles; and (ii) from the network-connected service platform, disseminating selected BSFC type data to at least some of the plurality of communicatively coupled vehicles, wherein the particular BSFC type data selected for dissemination to a particular vehicle is based on correspondence of a fuel-fed engine configuration of the disseminated-to vehicle with that of at least one received-from vehicle.

In some embodiments, the method further includes determining fuel-fed engine configuration correspondences at least in part using signatures derived or ascertainable from information retrieved via respective on-vehicle controller area network interfaces. In some cases or embodiments, respective vehicles each include at least one electric drive axle configured to supplement a primary source of motive torque; and electric drive controllers on the respective vehicles are configured to apply an equivalent consumption minimization strategy (ECMS) using the BSFC type data to characterize efficiency of the fuel-fed engine with which the electric drive axle is paired in the through-the-road (TTR) hybrid configuration.

In some embodiments, the method further includes receiving or determining additional vehicle operating conditions in or for association with the received BSFC type data, the additional vehicle operating conditions including one or more of: (i) geoposition, regional location or route for the received-from vehicle; (ii) weather or climatic data for the received-from vehicle; and (iii) an engine or vehicle load characteristic for the received-from vehicle. In some embodiments, the method further includes determining fuel-fed engine configuration correspondences at least in part using the additional vehicle operating conditions. In some embodiments, the method further includes communicating the received and disseminated BSFC type data to and from particular vehicles via mobile data communication interfaces.

In some embodiments in accordance with the present inventions, a system includes a network-connected service platform that at least partially hosts an information store of brake-specific fuel consumption (BSFC) type data for particular fuel-fed engines; a plurality of vehicles each having an electric drive axle configured to supplement, in a through-the-road (TTR) hybrid configuration, motive torque provided by a respective fuel-fed engine and primary drivetrain, and each having an electric drive controller with a mobile data communication interface by which the electric drive controller communicates with the network-connected service platform; the network-connected service platform configured to receive, from at least some of the plurality of vehicles, brake-specific fuel consumption (BSFC) type data determined or refined based on on-vehicle measurements during over-the-road travel for the fuel-fed engine of the respective, received-from vehicle; and the network-connected service platform further configured to supply, to at least some of the plurality of vehicles, BSFC type data for adaptation of an equivalent consumption minimization strategy (ECMS) to characteristics of the fuel-fed engine of the respective, supplied-to vehicle.

In some cases or embodiments, correspondence of the received and supplied BSFC type data with particular fuel-fed engine configurations is maintained using signatures derived or ascertainable from information retrieved by respective electric drive controllers via respective on-vehicle controller area network interfaces. In some cases or embodiments, the on-vehicle controller area network interfaces include J1939 interfaces by which the respective electric drive controllers are coupled to engine control modules of the respective fuel-fed engines with which they are currently paired in the TTR hybrid configuration. In some cases or embodiments, the electric drive controllers are configured to retrieve, via the respective on-vehicle controller area network interfaces, signatures indicative of the fuel-fed engines with which they are currently paired.

In some cases or embodiments, the electric drive controllers are further configured to retrieve, via the mobile data communications interfaces and based on the indicative signatures, BSFC type data for the fuel-fed engines with which they are currently paired. In some cases or embodiments, the electric drive controllers are further configured to provide, via the respective mobile data communications interfaces thereof, both (i) BSFC type data computed based on parameters collected on-vehicle for over-the-road operation of the fuel-fed engines with which they are currently paired and (ii) the respective indicative signatures. In some cases or embodiments, the collected parameters include one or more of load, fuel usage and engine rpm retrieved, for particular fuel-fed engines, via the respective on-vehicle controller area network interfaces, and, based on the parameters collected, the respective on-vehicle electric drive controller refines the BSFC type data set for ECMS application on-vehicle and for dissemination, via the network-connected service platform, to other vehicles having a similar fuel-fed engine configuration.

In some cases or embodiments, the electric drive controller of at least some of the vehicles is adapted to the respective fuel-fed engine with which the electric drive axle is paired based on crowdsourced BSFC type data supplied to the respective electric drive controller via the network-connected service platform. In some cases or embodiments, the crowdsourced BSFC type data, once retrieved, adapts operation of the controller and electric drive axle to the fuel-fed engine of the respective vehicle configuration.

In some cases or embodiments, a first one of the plurality of vehicles initially includes a trailer coupled to a first tractor unit that provides a first fuel-fed engine, and the first vehicle is configured to retrieve crowdsourced BSFC type data for a second fuel-fed engine different from the first fuel-fed engine after decoupling from the first tractor unit and instead coupling to a second tractor unit that include the second fuel-fed engine. In some cases or embodiments, the crowdsourced BSFC type data, once retrieved, adapts operation of the controller and electric drive axle to the fuel-fed engine of the second tractor-trailer vehicle configuration.

In some embodiments, the system further includes an energy store on each of the vehicles, the respective energy stores configured to supply the respective electric drive axles with electrical power in a first mode of operation and further configured to receive energy recovered using the respective electric drive axle in a second mode of operation.

In some cases or embodiments, the BSFC type data includes one or more of: a machine readable encoding of multi-dimensional data characterizing efficiency of a corresponding fuel-fed engine as a function of at least engine torque related measure and an engine speed related measure; a machine readable encoding of BSFC curves or surfaces; and a machine readable encoding of data derivative of either or both of the foregoing.

In some cases or embodiments, at least some the vehicles include: a tractor unit having the respective fuel-fed engine, primary drivetrain, electric drive axle and electric drive controller therefor. In some cases or embodiments, at least some the vehicles include: a tractor unit having the respective fuel-fed engine and primary drivetrain; and a trailer having the respective electric drive axle and electric drive controller therefor.

BRIEF DESCRIPTION OF THE DRAWINGS

The present invention is illustrated by way of example and not limitation with reference to the accompanying figures, in which like references generally indicate similar elements or features.

FIGS. 1B, 1C, 1D, and 1E are depictions of various hybridizing assembly configurations consistent with the illustration of FIG. 1A and some embodiments of the present inventions. FIGS. 1C and 1B depict tractor unit configurations with fore- and aft-positioned electric drive axles paired on the tractor unit in a through-the-road (TTR) hybrid configuration with fuel-fed engine and primary drivetrain. FIGS. 1D and 1E depict bottom and top views of an exemplary hybridizing suspension assembly (e.g., for a trailer) including an electric drive axle suitable for pairing in a tractor-trailer vehicle configuration in a through-the-road (TTR) hybrid configuration with the fuel-fed engine and primary drivetrain of a tractor unit.

Figure 1A:
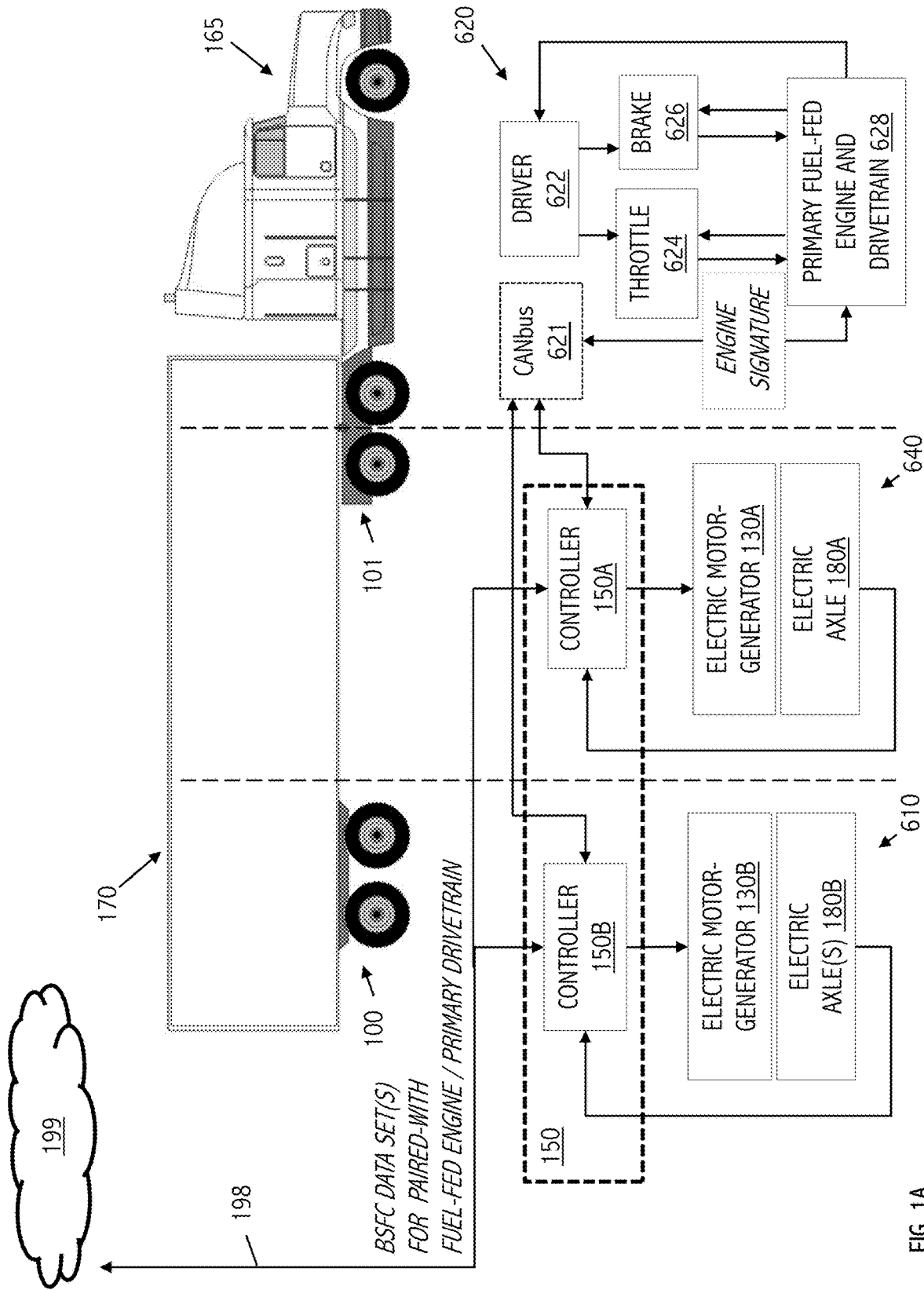
FIG. 1A is functional block diagram illustrating hybridizing control, in accordance with some embodiments of the present inventions, of both on-trailer and on-tractor electric drive axles based on brake specific fuel consumption (BSFC) type data retrieved for a particular fuel-fed engine with which each is paired. Embodiments in accordance with the present inventions may include hybridizing assemblies in either or both locations.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of certain embodiments of the present invention(s).

DETAILED DESCRIPTION

The present application describes a variety of embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for purposes of simplicity and clarity and does not in itself dictate an identity relationship between the various embodiments and/or configurations discussed.

More specifically, the present application describes designs and techniques for providing an energy management system and related methods in the context of system and components typical in the heavy trucking industry. Some embodiments of the present invention(s) provide a hybridizing assembly (e.g., an electrically driven axle, power source, electric drive controller, etc. that may be integrated with suspension components) affixed (or suitable for affixing) underneath a vehicle (e.g., a truck, tractor unit, trailer, tractor-trailer or tandem configuration, etc.) as a replacement to a passive axle or suspension assembly. In various non-limiting example configurations, a hybridizing assembly (or components thereof) may be included as part of a fuel-consuming tractor unit or tandem. In additional non-limiting example configurations, a hybridizing assembly can (alternatively or additionally) be part of a trailer that may be towed by a powered vehicle, such as a fuel-consuming tractor unit. Configurations of FIG. 1A-1E are illustrative, though not exhaustive.

As described in more detail below, a hybridizing assembly is but one realization in which an electrically driven axle operates largely independently of the fuel-fed engine and primary drivetrain of a powered vehicle and is configured to operate in a power assist, regeneration, and passive modes to supplement motive/braking forces and torques applied by the primary drivetrain and/or in braking. In general, one or more electrically driven axles may supplement motive/braking forces and torques under control of a controller (or controllers) that does not itself (or do not themselves) control fuel-fed engine and primary drivetrain. Instead, control strategy implemented by an electric drive controller seeks to follow and supplement the motive inputs of the fuel-fed engine and primary drivetrain using operating parameters that are observable (e.g., via CANbus or SAE J1939 type interfaces), kinematics that are sensed and/or states that may be computationally estimated based on either or both of the foregoing. In some embodiments, based on such observed, sensed or estimated parameters or states, the electric drive controller applies an equivalent consumption minimization strategy (ECMS) or adaptive ECMS type control strategy to modulate the motive force or torque provided, at the electrically driven axle(s), as a supplement to that independently applied using the fuel-fed engine and primary drivetrain of the powered vehicle.

By supplementing the fuel-fed engine and primary drivetrain of the powered vehicle, some embodiments of the present invention(s) seek to simultaneously optimize fuel consumption of the powered vehicle, energy consumption of the hybridizing assembly, and/or state of charge (SOC) of on-board batteries or other energy stores. In some cases, such as during stopovers, embodiments of the present disclosure allow the fuel-fed engine to shut down rather than idle. In some cases, energy consumption management strategies may take into account a desired SOC at scheduled, mandated or predicted stopovers. Among other advantages, embodiments disclosed herein may provide for a significant reduction in fuel consumption (e.g., an average of about 30%), a built-in auxiliary power unit (APU), enhanced stability control, improved trailer dynamics, and a host of other benefits, at least some of which are described in more detail below.

FIG. 1A is an exemplary functional block diagram illustrating control of both on-trailer (100) and on-tractor (101) electric drive axles based on brake specific fuel consumption (BSFC) type data retrieved (198) for a particular fuel-fed engine and primary drivetrain 628 with which each is paired. In the configuration of FIG. 1A, a vehicle comprising both a tractor unit 165 and a trailer 170 is shown. The hybrid system allows controllers for either or both of the illustrated electric drive axles (180A, 180B) to apply a through-the-road (TTR) hybridization strategy using control algorithms that implement an equivalent consumption minimization strategy (ECMS), an adaptive ECMS or similar strategy based on a characterization of efficiency at varying loads and operating points for the specific fuel-fed engine (628) with which they are paired. Although FIG. 1A illustrates one or more electric drive axles on-trailer (180B) and an electric drive axle on-tractor (180A), alternative configurations may employ just one or the other. In embodiments that provide electric drive axles in both locations, e.g., as electric drive axles 180A, 180B, corresponding drive controllers may be implemented separately, e.g., as electric drive controllers 150A, 150B, or integrated as a single controller, represented here as electric drive controller 150.

Integration is a generally a matter of design choice. For purposes of clarity, the present description refers to related instances of an electric drive controller, an electric motor generator and electric axle(s) (e.g., 150A/130A/180A or 150B/130B/180B) using suffixes (A or B) where necessary or helpful to distinguish; however similar components may be referenced or described in shorthand without suffixes and without loss of descriptiveness if/when the particular instance of electric drive controller, an electric motor generator and/or electric axle(s) does not significantly affect the description.

Multiple control loops are illustrated in FIG. 1A. The first is a generally conventional control loop 620 illustrated relative to a tractor unit 165 having a fuel-fed engine and drivetrain (628) that supplies primary motive torque, while the second (electric drive control loop 640) and/or third (electric drive control loop 610) loops control supplemental torques applied at respective electric drive axles (180A, 180B). The first control loop (620) will be understood inasmuch as a driver 622 interacts with throttle (624), braking (626) and other controls (such as gear shift controls, not specifically shown) to cause the vehicle (here tractor unit 165 and its mechanically coupled trailer 170) to accelerate and decelerate during over-the-road travel. In general, persons of skill in the art will understand control loop 620 to be representative of the various inputs, settings, microcontrollers, algorithms, control actions, feedback controls, etc. that may exercise control over primary fuel-fed engine and drivetrain 628. In general, the vehicle (and here in a tractor-trailer configuration, tractor unit 165) may utilize as its fuel-fed engine any of a variety of engine technologies and fuel types such as diesel, gasoline, propane, biodiesel, ethanol (E85), compressed natural gas (CNG), hydrogen internal combustion engine (ICE), homogeneous charge compression ignition (HCCI) engine, hydrogen fuel cell, hybrid electric, plug-in hybrid, diesel- or turbine-electric engines, and/or other type(s) of fuel/technology.

Turning then to the supplemental electric drive axles and their associated control loops (640, 610, or both 640 and 610), persons of skill in the art having benefit of the present disclosure will understand that, in the illustrated embodiments, supplemental motive torque(s) is (are) supplied using one or more electric motor-generators and associated drive axles 130A/130B/130, 180A/180B/180 under control of respective controllers 150A/150B or a combined controller (150). Each of these supplemental electric drive axles and their associated control loops is configured to operate largely independently of the fuel-fed engine and primary drivetrain of a powered vehicle and, in some cases, autonomously from the engine and drivetrain controls of the powered vehicle.

As used herein, "autonomous" operation is terminology used to describe an ability of the hybridizing system (101, 100) to operate in a manner that is not directly responsive to throttle, gearing and other controls of loop 620 on the tractor unit 165, and instead to independently gain information about itself, the primary fuel-fed engine and drivetrain 628 and the environment, and to make decisions and/or perform various functions based on one or more algorithms stored in its own controller (150A/150B/150), as described in more detail below. In some embodiments of the present invention (s), "autonomous" operation does not preclude observation or estimation of certain parameters or states of a powered vehicle's fuel-fed engine or primary drivetrain (e.g., via CANbus 621 or otherwise); however, electrically driven axles (180A/180B/180) are not directly controlled by an engine control module (ECM) of the powered vehicle and, even where ECMS or adaptive ECMS-type control strategies are employed, no single controller manages control inputs to both the supplemental electrically driven axle(s) and the primary fuel-fed engine and drivetrain.

In an effort to identify this form or arrangement, the term through-the-road (TTR) hybrid system is employed and meant to convey to a person of skill in the art having benefit of the present disclosure, a range of embodiments in which some or all components of a supplemental electrically-driven axle, often (though not necessarily) including a controller, a power source, brake line sensors, CANbus or SAE J1939 type interfaces, sensor packages, off-vehicle radio frequency (RF) communications and/or geopositioning interfaces, etc. are arranged as a tandem or are integrable with components that are driven by the fuel fed engine and primary drivetrain to which the electrically driven axle acts as a supplement. The through-the-road (TTR) character is meant to emphasize that while electrically-driven and conventionally powered (e.g., by a fuel-fed engine and primary drivetrain) axles may be collocated, arranged as a tandem or otherwise integrated (or integrable) in assembly, they would not be understood by a person of skill in the art having benefit of the present disclosure to involve a combined drivetrain or transmission that blends the motive inputs of an electrical motor and a fuel-fed engine. Either or of both of hybridizing assemblies 101 and 100 will be understood to be operable, in conjunction with the primary fuel-fed engine and drivetrain 628, as a TTR hybrid system.

In some though not all embodiments, a TTR hybrid system can take on the form or character commonly understood with reference to a configuration referred to the US trucking industry as a 6×2, but in which an otherwise dead axle is instead powered using an electrically-driven axle (180A) and controller for coordinating its supplementation of primary motive force or torques provided by a primary drivetrain and fuel-fed engine. Here too, the tractor-trailer configuration illustrated in FIG. 1A is exemplary and will be understood to include a TTR hybrid system (101). Again, the tractor-trailer configuration is exemplary, and notwithstanding the ability of the trailer (170) to be decoupled from tractor units (e.g., tractor unit 165) that provide a TTR hybrid system, vehicles such as a heavy truck having a single frame or operable as or with tandem trailers (not specifically shown in FIG. 1A) will be understood to be amenable to inclusion of a TTR hybrid system.

In some embodiments of the present inventions, techniques are employed to recognize a primary fuel-fed engine (e.g., 628) with which an electrically-powered drive axle (e.g., 180A/180B/180) is paired and to adapt through-the-road (TTR) control strategies applied at the electrically-powered drive axle to characteristics of the particular, paired-with, fuel-fed engine. In some embodiments, a communication interface is used for retrieval (198), e.g., from a cloud-based telematics system service platform 199, of brake-specific fuel consumption (BSFC) data or the like for a recognized and paired-with fuel-fed engine. While the ability to adapt control strategies applied at the electrically-powered drive axle to the paired-with fuel-fed engine can be particularly advantageous in tractor-trailer configurations where an electrically-powered drive axle (e.g., on a trailer) is paired with an ever changing set of fuel-fed engines (e.g., on tractor), other configurations may also benefit. For example, even in fixed pairings (such as on a unitary vehicle or tractor configured with a 6×2 primary drivetrain and supplemental electric drive axle), the ability to retrieve BSFC type data for a particular, fuel-fed engine and adapt TTR control strategies applied at the electrically-powered drive axle facilitates applications where direct integration with engine controls is difficult, undesirable or ill-advised. In addition, in some embodiments, over-the-air (OTA) updates may be employed to adapt TTR control strategies based on crowdsourced insights for a particular engine/drive train configuration and/or in a manner particular to regional, route, terrain, climatic, weather, vehicle load or other factors.

In general, TTR designs using control strategies such as an equivalent consumption minimization strategy (ECMS) or an adaptive ECMS are contemplated and implemented at the supplemental torque delivering electrically-powered drive axle (or axles) in a manner that follows operational parameters or computationally estimates states of the primary drivetrain and/or fuel-fed engine, but does not itself participate in control of the fuel-fed engine or primary drivetrain. Although BSFC type data generic to a range of fuel-fed engines can be employed (at least initially), BSFC type data particular to the paired-with fuel-fed engine allows an ECMS implementation (or other similar control strategies) to adapt to efficiency curves for the particular fuel-fed engine and to improve overall efficiencies of the particular TTR hybrid configuration.

In various of the described embodiments, an ECMS-type controller (e.g., electric drive controller 150A/150B/150) for electrically-powered drive axle is not directly responsive to driver-, autopilot- or cruise-type throttle controls of the fuel-fed engine or gear selections by a driver or autopilot in the primary drivetrain. Instead, the controller is responsive to sensed pressure in a brake line for regenerative braking and to computationally-estimated operational states of the fuel-fed engine or of the drive train. In some cases, recognition of a particular fuel-fed engine and observables employed by the controller include information retrieved via a CANbus or SAE J1939 vehicle bus interface 621 such as commonly employed in heavy-duty trucks. While the ECMS-type controller employed for the electrically-powered drive axle (or axles) 180A/180B/180 adapts to the particular character and current operation of the fuel-fed engine and primary drivetrain 628 (e.g., apparent throttle and gearing), it does not itself control the fuel-fed engine or of the primary drivetrain.

TTR Hybrid System on Tractor Unit

Figures 1B, 1C:
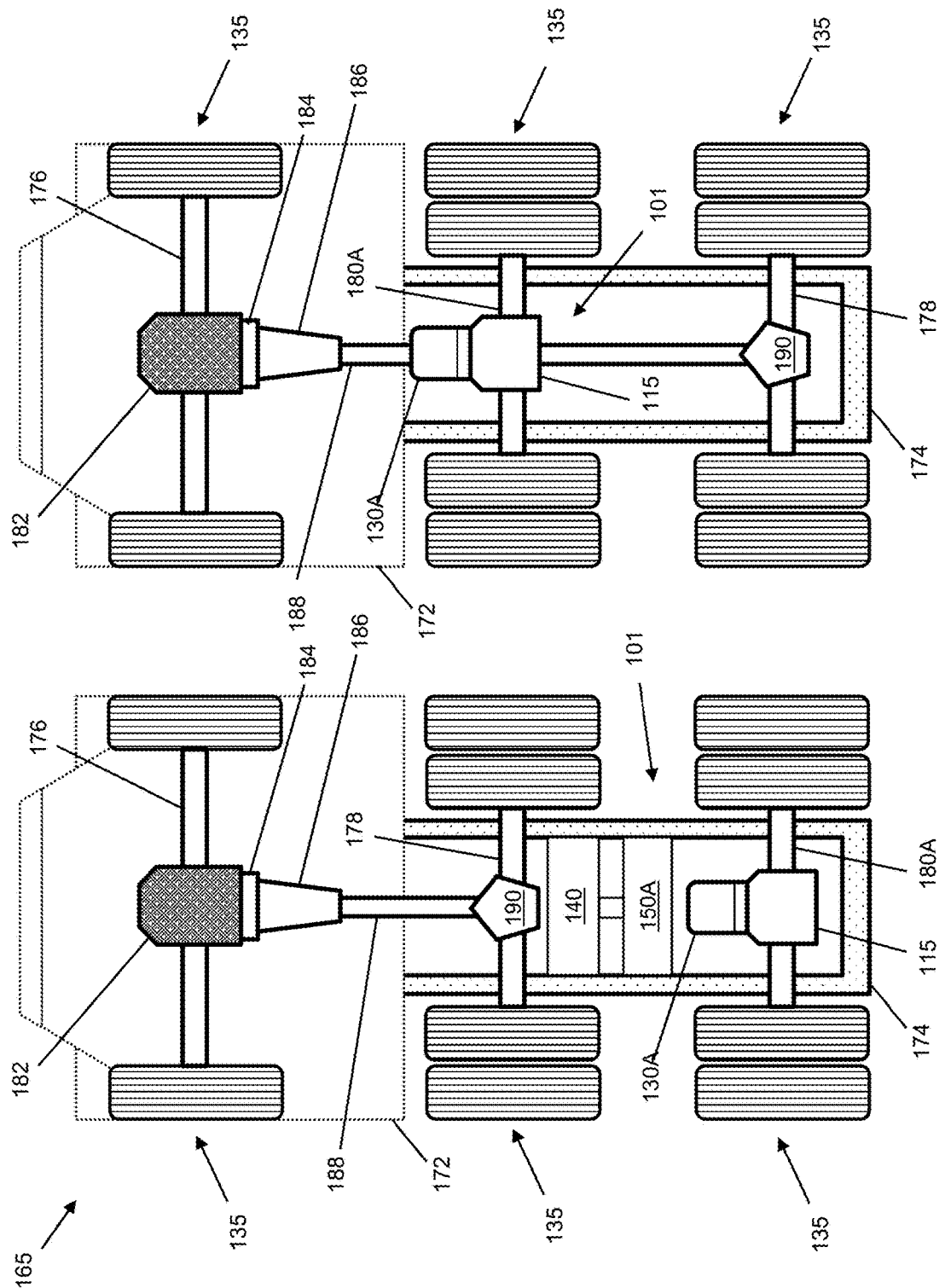

In some embodiments, one or more aspects of the hybridizing system explained above may be adapted for use as part of tractor unit 165. With reference to FIGS. 1A, 1B and 1C, such an adapted through the road (TTR) hybrid system 101 may include various elements described above, which are coupled to and/or integrated with existing components of tractor unit 165. In some examples, the TTR hybrid system 101 may provide for replacement of the one or more passive axles of the tractor unit 165 with one or more powered axles. Thus, in various embodiments, TTR hybrid system 101 may be used to provide a motive rotational force (e.g., in a first mode, or power assist mode, of operation) to a powered towing vehicle (e.g., to tractor unit 165). Additionally, in some embodiments, TTR hybrid system 101 is configured to provide a regenerative braking force (e.g., in a second mode, or regeneration mode, of operation) that charges an energy storage system (e.g., the battery array). In some examples, TTR hybrid system 101 is further configured to provide neither motive rotational nor regenerative braking force (e.g., in a third mode, or passive mode, of operation).

It is noted that TTR hybrid system 101 may, in some embodiments, be used separately and independently from hybridizing system 100 attached to the trailer. Thus, for example, advantages of the various embodiments disclosed herein (e.g., reduced fuel consumption and emissions, improved fuel efficiency, vehicle acceleration, vehicle stability, and energy recapture) may be realized by TTR hybrid system 101 apart from hybrid system system 100. This may be advantageous, for instance, when tractor unit 165 is driven without the attached trailer. To be sure, when tractor unit 165 is used to tow a trailer, and in some embodiments, hybridizing system 100 may be used with TTR hybrid system 101 in a cooperative TTR configuration operated to provide a greater motive rotational force to, or recapture a greater amount of energy from, tractor-trailer vehicle 160 than either of hybridizing systems 100 and 101 would be able to provide or recapture on their own.

With reference to FIG. 1B, illustrated therein is a bottom view of TTR hybrid system 101 coupled to and/or integrated with tractor unit 165. As shown, the tractor unit 165 may include a cab 172, a frame 174, a steering axle 176, an engine-powered axle 178, an electric axle 180A, and wheels/tires 135 coupled to ends of each of the steering axle 176, the engine-powered axle 178, and the electric axle 180A. A steering wheel may be coupled to steering axle 176 to turn and/or otherwise control a direction of travel of tractor unit 165. In various embodiments, tractor unit 165 further includes an engine 182, a torque converter 184 coupled to engine 182, a transmission 186 coupled to the torque converter 184, a drive shaft 188 coupled to the transmission 186, and a differential 190 coupled to the drive shaft 188. Differential 190 may be further coupled to the engine-powered axle 178, thereby providing torque to the wheels coupled to ends of the engine-powered axle 178. As part of the TTR hybrid system 101, and in various embodiments, electric motor-generator 130A may be coupled to electric axle 180A by way of a differential 115, thereby allowing electric motor-generator 130A to provide the motive rotational force in the first mode of operation, and to charge the energy storage system (e.g., the battery array) by regenerative braking in the second mode of operation. In some embodiments, electric axle 180A may include multiple electric-motor generators coupled thereto.

As shown in FIG. 1B, TTR hybrid system 101 may also include a battery array 140 and control system 150A/150, for example, coupled to each other by an electrical coupling, thereby providing for energy transfer between battery array 140 and electric motor-generator 130A. The battery array 140 may include any of a variety of battery types.

Referring to FIG. 1C, illustrated therein is a bottom view of an alternative embodiment of TTR hybrid system 101 coupled to and/or integrated with tractor unit 165. In the example of FIG. 1B, engine-powered axle 178 is disposed between steering axle 176 and electric axle 180A, which is disposed at a back end (e.g., opposite cab 172) of tractor unit 165. Alternatively, in the example of FIG. 1C, electric axle 180A is disposed between steering axle 176 and engine-powered axle 178, which is disposed at a back end (e.g., opposite the cab 172) of tractor unit 165. While not explicitly shown in FIG. 1C for clarity of illustration, TTR hybrid system 101 provided therein may also include battery array 140 and control system 150A/150, as described above.

Generally, TTR hybrid system 101 may include a battery, a motor controller, a cooling system, an APU, low voltage controls, GPS/LTE receivers, a motor and gearbox, and a truck CAN bus interface. While not explicitly shown in the drawings, TTR hybrid system 101 of FIGS. 1A, 1B and 1C may further include other features described herein such as additional controllers, brake line sensors, SAE J1939 type interfaces, sensor packages, off-vehicle mobile, radio frequency (RF) communications, etc.

Although TTR hybrid system configurations are described in the context of a tractor unit suitable for use in a tractor-trailer configuration, persons of skill in the art having benefit of the present disclosure will appreciate configurations in which powered vehicles, including heavy trucks with a single effective frame, include the systems methods and/or techniques disclosed herein relative to tractor unit, trailer, tractor-trailer and/or tandem configurations.

TTR Hybrid System with Trailer

Referring now to FIG. 1D, the hybridizing system 100 previously illustrated in FIG. 1A, may include a frame 110, a suspension, one or more drive axles (e.g., such as a drive axle 180B), at least one electric motor-generator (e.g., such as an electric-motor generator 130B) coupled to the at least one or more drive axles, an energy storage system (e.g., such as battery array 140), and a controller (e.g., such as electric drive controller 150B). In accordance with at least some embodiments, the hybridizing system 100 is configured for attachment beneath a trailer (recall trailer 170, FIG. 1A). As used herein, the term "trailer" is used to refer to an unpowered vehicle towed by a powered vehicle. In some cases, the trailer may include a semi-trailer coupled to and towed by a truck or tractor (e.g., a powered towing vehicle) such as tractor unit 165, previously described.

To be sure, embodiments of the present disclosure may equally be applied to other types of trailers (e.g., utility trailer, boat trailer, travel trailer, livestock trailer, bicycle trailer, motorcycle trailer, a gooseneck trailer, flat trailer, tank trailer, farm trailer, or other type of unpowered trailer) towed by other types of powered towing vehicles (e.g., pickup trucks, automobiles, motorcycles, bicycles, buses, or other type of powered vehicle), without departing from the scope of this disclosure.

As before, the hybridizing system 100 is configured to operate largely independently of the fuel-fed engine and primary drivetrain of a powered vehicle and, in some cases, autonomously such that it operates in a manner that is not directly responsive to throttle, gearing and other engine and drivetrain controls of the powered vehicle. Instead, hybridizing system 100 independently gains information about itself, the primary fuel-fed engine and drivetrain of a towing vehicle and the environment, and makes decisions and/or perform various functions based on one or more algorithms stored in its own controller (150B/150), as described in more detail below. In some embodiments of the present invention(s), "autonomous" operation does not preclude observation or estimation of certain parameters or states of a powered vehicle's fuel-fed engine or primary drivetrain (e.g., via CANbus interface or otherwise); however, electrically driven axles (180B/180) are not directly controlled by an engine control module (ECM) of the powered vehicle and, even where ECMS or adaptive ECMS-type control strategies are employed, no single controller manages control inputs to both the supplemental electrically driven axle(s) and the primary fuel-fed engine and drivetrain.

In accordance with some embodiments of the present invention(s), hybridizing system 100 can be configured to provide, in a first mode of operation, a motive rotational force (e.g., by an electric motor-generator coupled to a drive axle) to propel the trailer under which is attached, thereby providing an assistive motive force to the powered towing vehicle. Thus, in some examples, a first mode of operation may be referred to as a "power assist mode." Additionally, in some embodiments, hybridizing system 100 is configured to provide, in a second mode of operation, a regenerative braking force (e.g., by the electric motor-generator coupled to the drive axle) that charges an energy storage system (e.g., battery array 140). Thus, in some examples, the second mode of operation may be referred to as a "regeneration mode." In some examples, hybridizing system 100 is further configured to provide, in a third mode of operation, neither motive rotational nor regenerative braking force such that the trailer and the attached hybridizing system 100 are solely propelled by the powered towing vehicle to which the trailer is coupled. Thus, in some examples, the third mode of operation may be referred to as a "passive mode."

In providing powered axle(s) to the trailer (e.g., by the hybridizing system 100), embodiments of the present disclosure result in a significant reduction in both fuel consumption and any associated vehicle emissions, and thus a concurrent improvement in fuel efficiency, of the powered towing vehicle. In addition, various embodiments may provide for improved vehicle acceleration, vehicle stability, and energy recapture (e.g., via regenerative braking) that may be used for a variety of different purposes. For example, embodiments disclosed herein may use the recaptured energy to apply the motive rotational force using the electric motor-generator and/or provide on-trailer power that may be used for powering a lift gate, a refrigeration unit, a heating ventilation and air conditioning (HVAC) system, pumps, lighting, communications systems, and/or providing an auxiliary power unit (APU), among others. It is noted that the above advantages and applications are merely exemplary, and additional advantages and applications will become apparent to those skilled in the art upon review of this disclosure.

Referring again to FIG. 1D, illustrated therein is a bottom view of an exemplary hybridizing system 100 which shows frame 110, drive axle 180B, a passive axle 125, and wheels/tires 135 coupled to ends of each of the drive axle 180B and the passive axle 125. In some embodiments, electric motor-generator 130B is coupled to electric drive axle 180B by way of a differential 115, thereby allowing electric motor generator 130B to provide the motive rotational force in the first mode of operation, and to charge the energy storage system (e.g., battery array 140) by regenerative braking in the second mode of operation. Note that in some embodiments, components such as the electric motor generator, gearing and any differential may be more or less integrally defined, e.g., within a single assembly or as a collection of mechanically coupled components, to provide an electrically-driven axle.

While shown as having one drive axle and one passive axle, in some embodiments, hybridizing system 100 may have any number of axles, two or more drive axles, as well as multiple electric-motor generators on each drive axle. In addition, axles of the hybridizing system (e.g., drive axle 180B and passive axle 125) may be coupled to frame 110 by a leaf spring suspension, an air suspension, a fixed suspension, a sliding suspension, or other appropriate suspension. In some embodiments, the wheels/tires 135 coupled to ends of one or both of the drive axle 180B and the passive axle 125 may be further coupled to a steering system (e.g., such as a manual or power steering system), thereby providing for steering of hybridizing system 100 in a desired direction.

With reference to FIG. 1E, illustrated therein is a top view of hybridizing system 100 showing battery array 140 and electric drive controller 150B/150. In various embodiments, battery array 140 and controller 150B/150 may be coupled to each other by an electrical coupling 145. In addition, electric motor-generator 130B may be coupled to controller 150B/150 and to battery array 140, thereby providing for energy transfer between battery array 140 and electric motor-generator 130B. In various examples, the battery array 140 may include one or more of an energy dense battery and a power dense battery. For example, in some embodiments, battery array 140 may include one or more of a nickel metal hydride (NiMH) battery, a lithium ion (Li-ion) battery, a lithium titanium oxide (LTO) battery, a nickel manganese cobalt (NMC) battery, a supercapacitor, a lead-acid battery, or other type of energy dense and/or power dense battery.

Control System Architecture and Components

Figure 2:
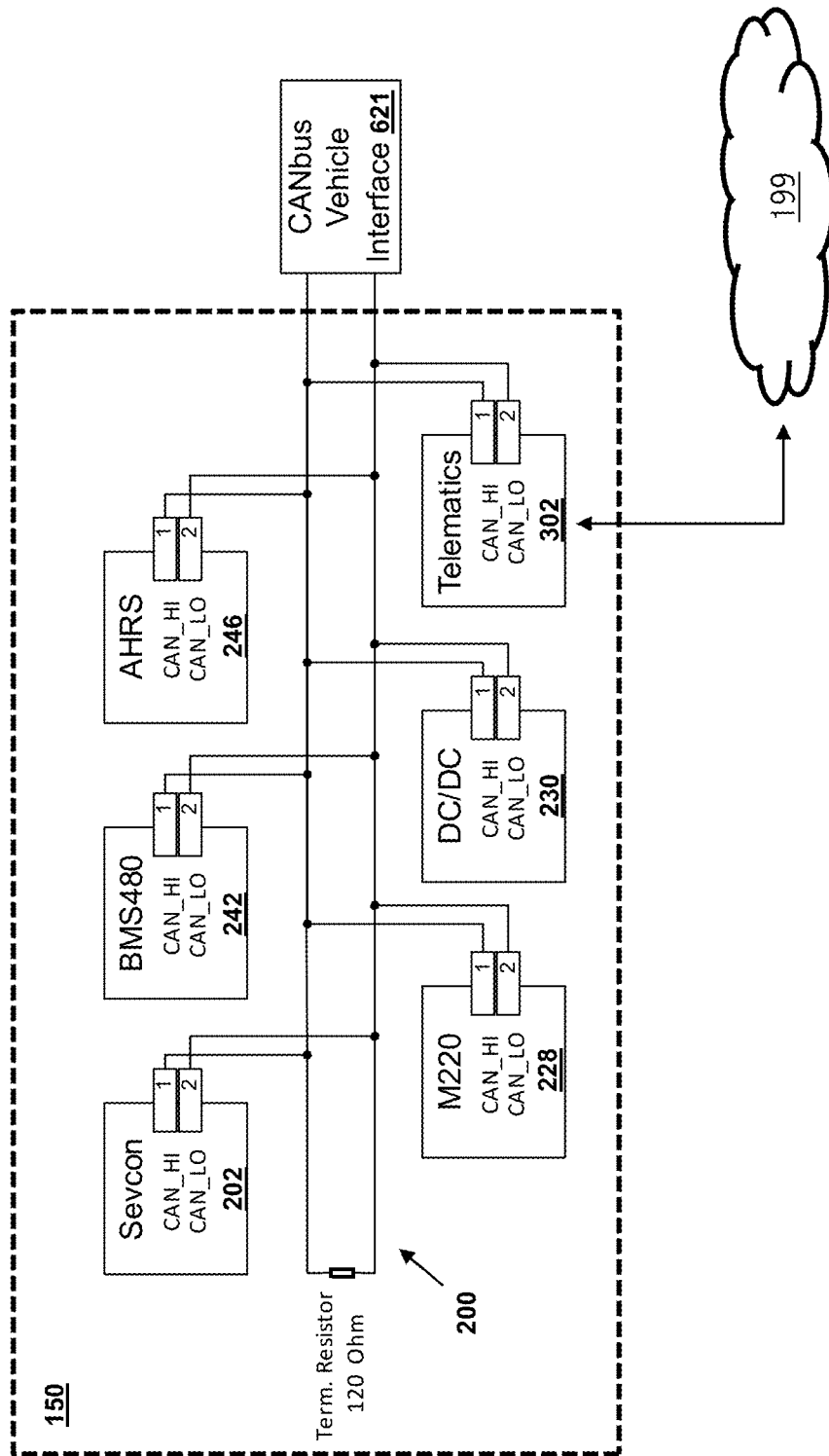
FIG. 2 illustrates components and selected interfaces of an electric drive controller in accordance with some embodiments of the present inventions.

With reference now to FIG. 2, illustrated therein is an embodiment of electric drive controller 150A/150B/150, including controller area network (CANbus) 200 used for communication of the various components of electric drive controller 150B/150 with one another and with external components such as cloud-based telematics system service platform 199 and a CANbus vehicle interface 621 of tractor unit 165 (recall FIG. 1A). Note that architecture and operation of the electric drive controller is generally similar whether a particular instance thereof is deployed as electric drive controller 150A, 150B, or 150 (recall FIGS. 1A-1E).

Generally, a CANbus is a vehicle bus standard designed to allow microcontrollers and other devices such as electronic control units (ECUs), sensors, actuators, and other electronic components, to communicate with each other in applications without a host computer. In various embodiments, CANbus communications operate according to a message-based protocol. Additionally, CANbus communications provide a multi-master serial bus standard for connecting the various electronic components (e.g., ECUs, sensors, actuators, etc.), where each of the electronic components may be referred to as a 'node'. In various cases, a CANbus node may range in complexity, for example from a simple input/output (I/O) device, sensors, actuators, up to an embedded computer with a CANbus interface. In addition, in some embodiments, a CANbus node may be a gateway, for example, that allows a computer to communicate over a USB or Ethernet port to the various electronic components on the CAN network.

In some embodiments, CANbus 200 includes an ISO 11898-2 high speed CAN bus (e.g., up to 1 Mb/s). By way of example, CANbus 200 is shown as including as nodes, for example, an AC motor controller 202, battery management system (BMS) 242, AHRS 246 (sensor), a master control unit 228, DC-DC power supply 230 (actuator), and telematics unit 302 (smart sensor). In some embodiments, the telematics unit 302 may include a global positioning system (GPS), an automatic vehicle location (AVL) system, a mobile resource management (MRM) system, a wireless communications system providing data communications with cloud-based telematics system service platform 199, a radio frequency identification (RFID) system, a cellular communications system, and/or other telematics systems. In some embodiments, telematics unit 302 may also include the AHRS 246. CANbus or SAE J1939 interfaces may be provided to other systems, such as interface 621 of a powered vehicle to facilitate read-type access to operating parameters or otherwise observable states of systems thereof.

Control Methods, Generally

Various aspects of the hybridizing system 100 and the TTR hybrid system 101 have been described above, including aspects of the control system architecture and related components. It has been noted that the hybridizing system 100 and the TTR hybrid system 101 are operated, by way of electric drive controllers 150A, 150B, 150 and suitable program code, in at least three modes of operation: (i) a power assist mode, (ii) a regeneration mode, and (iii) a passive mode. In at least some embodiments, the program code used to operate controllers 150A, 150B, 150 may reside on a memory storage device within the master control unit 228. In addition, the master control unit 228 may include a microprocessor and/or microcontroller operable to execute one or more sequences of instructions contained in the memory storage device, for example, to perform the various methods described herein. In some cases, one or more of the memory storage, microprocessor, and/or microcontroller may reside elsewhere within hybridizing system 100, within TTR hybrid system 101 or even at a remote location that is in communication with the hybridizing system 100 or TTR hybrid system 101.

Referring to FIG. 2, a variety of control systems designs are contemplated and will be appreciated by persons of skill in the art having benefit of the present disclosure. For example, in some embodiments, electric drive controllers 150A, 150B, 150 are programmed to apply an equivalent consumption minimization strategy (ECMS) or adaptive ECMS type control strategy to modulate the motive force or torque provided, at an electrically driven axle(s), as a supplement to motive force or torques that electric drive controllers 150A, 150B, 150 estimate are independently applied using the fuel-fed engine and primary drivetrain of the powered vehicle.

Persons of skill in the art having benefit of the present disclosure will appreciate that different fuel-fed engines produce different amounts of power based on the fuel supplied to them at different engine rpms. To optimize the usage of a parallel TTR hybrid, such as the system(s) illustrated in FIG. 1A, electric drive controllers 150A, 150B, 150 need to apply a specific amount of assistive propulsion to save the most amount of fuel over time. BSFC type data is one way of characterizing, for a given fuel-fed engine with which it is paired, efficiency as a function of engine speed (RPM) and torque. The BSFC curves of different diesel engines are similar enough to one another that we can apply a generic ECMS algorithm to target the generally more efficient engine operating zones, but the system will not achieve optimal efficiency based on the specific engine with which the electric drive axle(s) is (are) paired.

Accordingly, in some embodiments of the present inventions, BSFC type data is generated or obtained for the specific paired-with fuel fed engine. In some embodiments, BSFC type data is generated (learned) on-vehicle and optionally supplied through off-vehicle communications to other vehicles and their controllers. In some embodiments, BSFC type data is retrieved or supplied via such off-vehicle communications. In general, such off-vehicle communications may be via terrestrial mobile data networks (2G/3G/LTE/5G), via overhead satellites, via networks interfaces through IEEE 802.11 or Wi-Fi access points or using other radio frequency communication facilities now or hereafter deployed in transportation. In the illustrated embodiment(s), an interface (621) with an engine control module (ECM) via a CANbus provides a convenient way of retrieving and identifying a signature for the particular, paired-with, fuel-fed engine. Likewise, in some embodiment(s), such an interface facilitates access to instantaneous (or near instantaneous) measures of engine load, fuel usage and engine RPMs, which can be used to converge an initial set of BSFC data on values that more particularly characterize the paired-with, fuel-fed engine.

Figure 3:
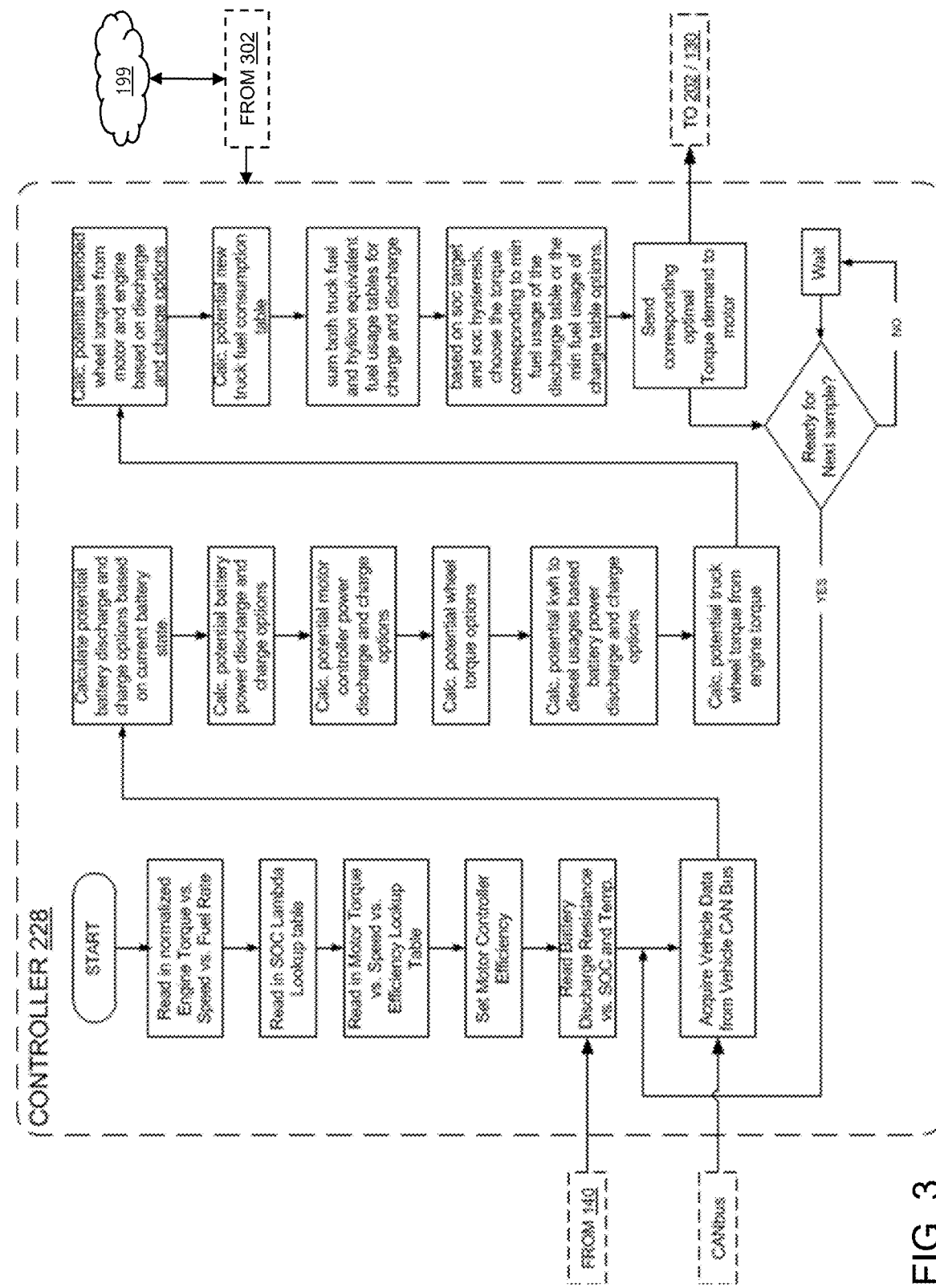
FIG. 3 illustrates an exemplary computational flow for components of an electric drive controller operating in accordance with some embodiments of the present inventions.

FIG. 3 is a flow diagram that illustrates computations of a controller that applies an equivalent consumption minimization strategy (ECMS) to the hybridizing system 100 or TTR hybrid system 101 designs previously explained. Interactions of a programmed controller 228 with battery array 140, with a vehicle CANbus (for retrieval of operating conditions indicative of current torque delivered by fuel-fed engine through the primary drive train and current gear ratios of that primary drivetrain), and ultimately with electric motor-generator 130A/130B via any local controller (e.g., sevcon controller 202) are all illustrated. Likewise, retrieval of particular (or even crowdsourced) BSFC type data via off-vehicle communications is illustrated via telematics unit 302 and cloud-based telematics system service platform 199.

Referring to FIG. 3, based on the current SOC for battery array 140, an array of possible options for amperage discharge and charge values are calculated. These possibilities are converted to kW power as potential battery power discharge and charge possibilities. Battery inefficiencies and motor controller inefficiencies are considered along with possible electric drivetrain gear ratios to arrive at the corresponding potential electric motor torques that can be applied and resultant wheel torques which can be applied to the vehicle using electric motor-generator 130A/130B. Using the battery power discharge and charge possibilities, a corresponding diesel usage table is calculated using a lookup table that stores values for battery power equivalence based on various SOC conditions of battery array 140.

Based on current operating parameters retrieved from the vehicle CANbus (e.g., engine torque and current gear ratios in the primary drivetrain) or optionally based on estimates calculated based on a high-precision inertial measurement unit (IMU) effective torque delivered at vehicle wheels by the fuel-fed engine and the primary drivetrain is calculated or otherwise computationally estimated at controller 228. Potential supplemental torques that can be provided at wheels driven (or drivable) by electric motor-generator 130A/130B are blended with those calculated or estimated for vehicle wheels driven by the fuel-fed engine and primary drivetrain in a calculation that back-calculates where the various additional supplemental torques would place the vehicle's engine. Then, based on these new values for the fuel-fed engine and primary drivetrain, a vehicle fuel usage consumption table is updated and, in turn, combined with (computationally summed) a charge/fuel usage table for electric motor-generator 130A/130B. Based on the current SOC, SOC targets, and SOC hysteresis, a minimum index value from the discharge fuel usage table or the charge fuel usage table is used. A motor torque at this index is retrieved from the motor torque possibilities table, and this torque demand is sent to electric motor-generator 130A/130B via any local controller (e.g., sevcon controller 202) to be applied as supplemental torque via the electric drivetrain in a TTR hybrid configuration.

To optimize the usage of a parallel TTR hybrid, such as the system(s) illustrated in FIG. 1A, electric drive controllers 150A/150B/150 need to cause electric motor-generators 130A/130B to supply a specific amount of assistive propulsion to save the most amount of fuel over time. As previously explained, different engines produce different amounts of power based on the fuel supplied to them at different engine rpms. BSFC type data is one way of characterizing, for a given fuel-fed engine, efficiency as a function of engine speed (RPM) and torque. Accordingly, in some embodiments of the present inventions, BSFC type data is generated, refined or obtained for the specific paired-with fuel fed engine based on techniques described herein (whether signature based retrieval, iterative adaptation or crowdsourcing) and used in the ECMS strategy explained above.

Figure 4:
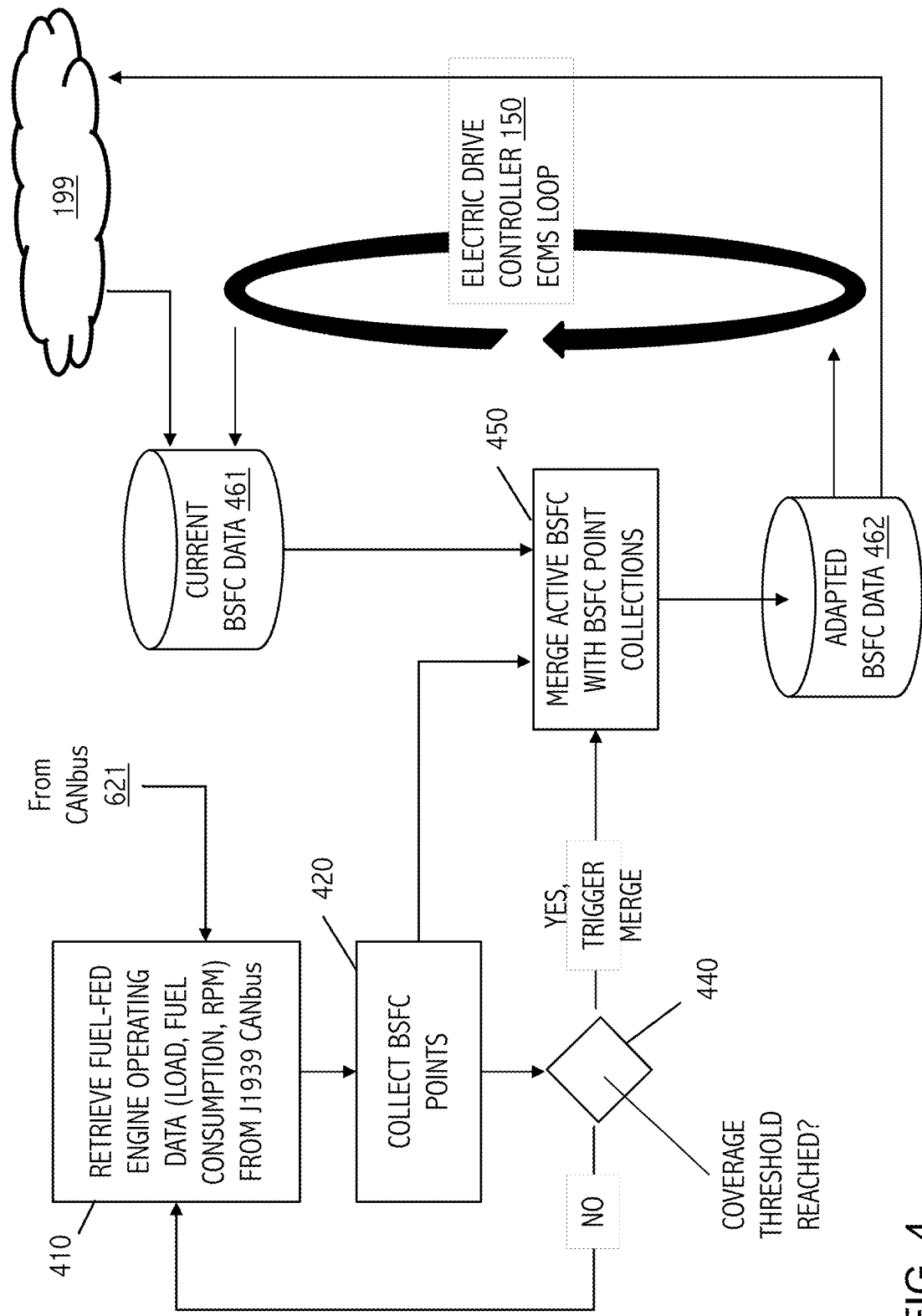
FIG. 4 illustrates an exemplary computational flow for adaptation of brake-specific fuel consumption type data based on operational data acquired on vehicle and in accordance with some embodiments of the present inventions.

Finally, in some embodiments, we adapt generic BSFC curve data to the truck's performance over-time. Adaptation can occur while the electric drive axle(s) is (are) not in use, either before TTR hybrid operation engages over an initial "learning period" or while the system is out of battery during extended periods of inactivity. Adaptation may also, or alternatively, occur during the TTR hybrid operation. In such cases, the supplemental torques applied using the electric drive axle(s) can be equalized and accounted for with larger error correction needed for vehicle dynamics. FIG. 4 illustrates an exemplary computational flow for adapting BSFC type data characterization of a fuel-fed engine that has been paired-width electric drive axles and controllers in a TTR hybrid configuration.

In general, efficiency can be defined as torque/fuel usage. Torque can be calculated using engine load*max_torque for the engine in question. Engine load, fuel usage and engine_rpms are outputs available from the truck's ECM over the J1939 diagnostics bus while the max_torque would need to be obtained from the engine itself, OEM, or additional engine software settings. FIG. 4 depicts retrieval (410) of operating parameters for a J1939 CANbus (recall CANbus 621, FIG. 1A). These inputs allow us to collect (420) new points for our BSFC curve which is a multi-dimensional table that we have obtained (initially) in any of a variety of ways such as data retrieval from cloud-based telematics system service platform 199 based on an engine signature obtained via CANbus 621, as crowdsourced data or simply as generic engine data for initial conditions. Adaptation of current BSFC data 461 is performed iteratively based, in the illustrated embodiment, on a coverage threshold 440. With axes of engine rpm, torque and efficiency, we take new points computed based on observations during the periods explained previously, and computationally merge (450) them into our current or generic BSFC curve data 461 over-time. Adapted BSFC data 462 is used in ECMS loop(s) of electric drive controller(s) 150A/150B/150 (recall FIG. 1A). In some cases, adapted BSFC data 462 is uploaded to cloud-based telematics system service platform 199 (typically together with engine operating data, geoposition, regional location or route data, weather or climatic data) and selectively supplied to other TTR hybrid vehicle systems as part of a crowd sourcing technique.

Based on weighted multipliers, the new updated BSFC data 462 will converge on values that more accurately characterize the particular, paired-with fuel-fed engine. Note that, as a practical matter, we need to make sure that when convergence updates are performed, new BSFC curve data sufficiently covers (440) the data set, so that we aren't updating only one half of the curve, potentially causing rifts and cliffs between efficiency zones, as such discontinuities can result in inefficiencies within an ECMS implementation. As actual engine performance is reflected in the adapted BSFC curve data 462, the parallel TTR hybrid system applies better fuel efficiency predictions in its equivalent consumption minimization strategy (ECMS) to increase overall efficiency of the TTR hybrid system 100, 101.

Telematics System Interfaces and Network

Figure 5A:
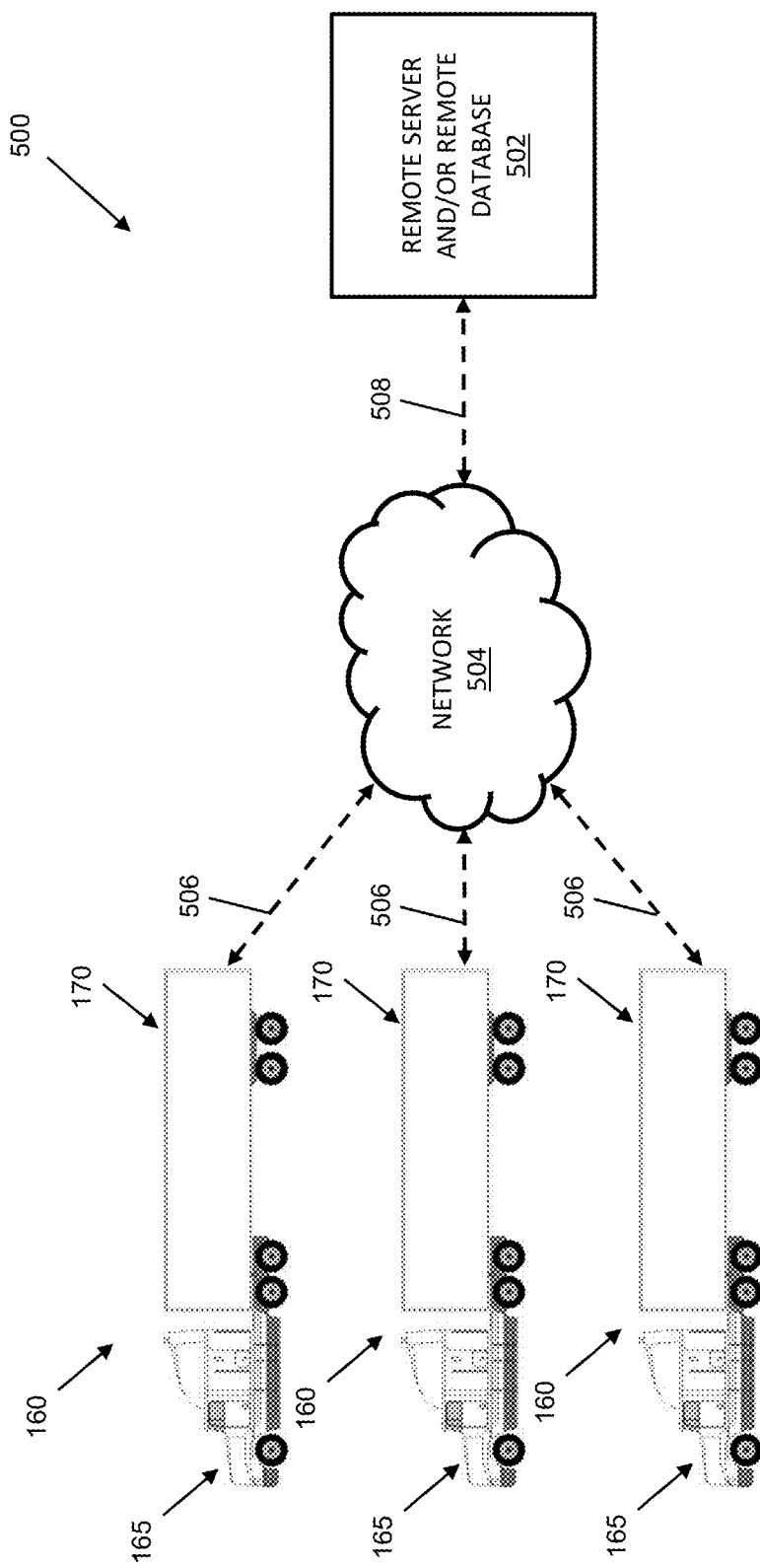
FIGS. 5A and 5B illustrate telematics systems and communication interfaces in accordance with some embodiments of the present inventions.

As explained herein, TTR hybrid systems 100, 101 may communicate with network-connected server, database, or other network-connected service platform such as cloud-based telematics system service platform 199. FIG. 5A depicts an exemplary system 500 for providing communication between a tractor-trailer vehicle and a network-connected service platform. In some embodiments, one or more tractor-trailer vehicles 160 are configured to communicate with a remote server 502 by way of a network 504, using one or more network communication devices.

The network 504 may be implemented as a single network or a combination of multiple networks. For example, in various embodiments, the network 504 may include the Internet and/or one or more intranets, landline networks, wireless networks, cellular networks, satellite networks, point-to-point communication links, and/or other appropriate types of networks. In some examples, the one or more tractor-trailer vehicles 160 and the remote server 502 may communicate through the network 504 via cellular communication, by way of one or more user-side network communication devices or server-side network communication devices. Thus, as merely one example, connections 506 between the one or more tractor-trailer vehicles 160 and the network 504 may include a 3 G cellular connection, a universal mobile telecommunications system (UMTS) connection, a high-speed packet access (HSPA) connection, a 4 G/LTE connection, a combination thereof, or other appropriate connection now existing or hereafter developed. Further, in an example, a connection 508 between the network 504 and the remote server 502 may include an Internet trunk connection. The Internet trunk connection may be used to simultaneously provide network access to a plurality of clients, for example, such as the one or more tractor-trailer vehicles 160.

In other examples, the one or more tractor-trailer vehicles 160 and the remote server 502 may communicate through the network 504 via wireless communication (e.g., via a WiFi network), by way of one or more user-side network communication devices or server-side network communication devices. In yet other examples, the one or more tractor-trailer vehicles 160 and the remote server 502 may communicate through the network 504 via any of a plurality of other radio and/or telecommunications protocols, by way of one or more user-side network communication devices or server-side network communication devices. While some examples of communication between the one or more tractor-trailer vehicles 160 and the remote server 502 have been provided, those skilled in the art in possession of the present disclosure will recognize other network configurations, components, and/or protocols that may be used, while remaining within the scope of the present disclosure.

Figure 5B:
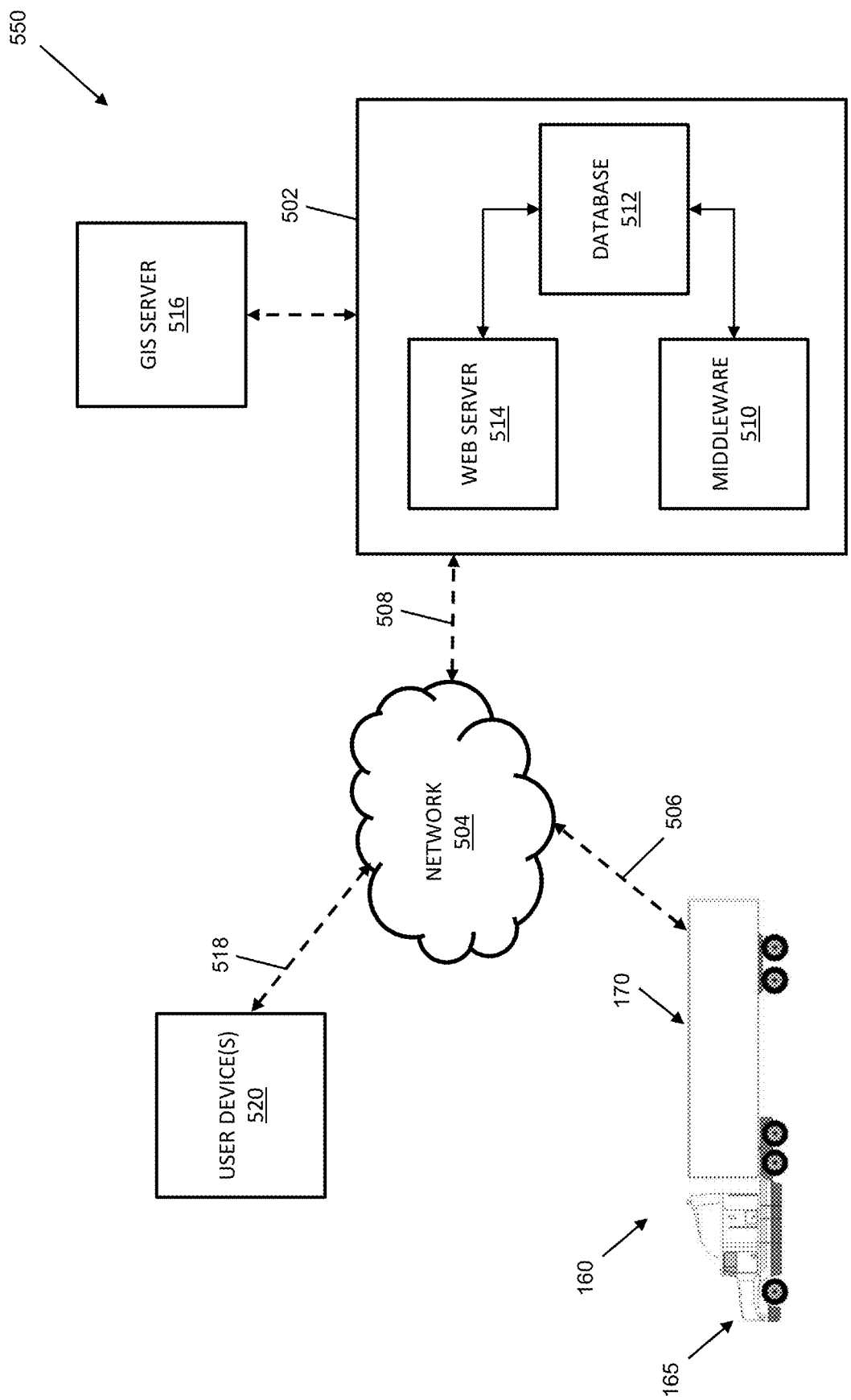

With reference to FIG. 5B, illustrated therein is an exemplary system 550 for providing communication between a tractor-trailer vehicle and a network server or remote server/database. Various aspects of the system 550 are substantially the same as the system 500, discussed above. Thus, for clarity of discussion, some features may only be briefly discussed. FIG. 5B, in particular, provides a more detailed view of the remote server 502. As shown, the remote server 502 may include a middleware component 510, a database 512, and a web server 514. In various examples, each of the middleware 510, the database 512, and the web server 514 may be implemented using separate machines (e.g., computers/servers), or may be collocated on a single machine. The middleware 510 may be configured to receive and process data (e.g., BSFC type data and signatures) and store the data in the database 512. The database 512 may be used to store any such data received from any of a number of tractor-trailer vehicles 160, as well as to store customer/user account information, and store asset tracking information (e.g., for tracking the tractor-trailer vehicles 160).

In some examples, the database 512 is implemented using a PostgreSQL object-relational database management system, enabling multi-node clustering. The web server 514 can be used to store, process, and deliver web pages (e.g., that provide a user-interface) to any of a plurality of users operating user devices 520. In some embodiments, the user devices 520 may include any type of computing device such as a laptop, a desktop, a mobile device, or other appropriate computing device operated by any type of user (e.g., individual, driver, fleet manager, or other type of user). In some examples, connections 518 between the user devices 520 and the network 504 may include a 3 G cellular connection, a universal mobile telecommunications system (UMTS) connection, a high-speed packet access (HSPA) connection, a 4G/LTE connection, an RF connection, a Wi-Fi connection, a Bluetooth connection, another wireless communication interface, combinations thereof, or other appropriate connection now existing or hereafter developed. In some embodiments, the remote server 502 may further couple to a geographic information system (GIS) server 516, which provides maps for the GPS locations associated with data received vehicles.

In addition to the various features described above, the systems 500, 550 may be configured to provide real-time location and mapping of tractor-trailer vehicles 160 (including a tractor unit or trailer), an ability to assign tags to any particular tractor unit or trailer (e.g., to provide a trailer type, trailer number, group/region/fleet information, owner information, or contact information), an ability to provide on-demand and/or schedulable reports, among other features. By way of example, such reports may include a percentage time a trailer is loaded vs. empty, moving vs. stationary, and/or attached vs. standalone. Exemplary reports may further provide an approximate trailer weight, fuel savings information, shock/vibration information, braking information, adverse swaying (e.g., jack-knifing) information, lost traction/wheel-slip information, battery levels, and/or APU usage information. The systems 500, 550 also provide for the configuration of alerts (e.g., to alert a driver, fleet manager, or other user) for a variety of conditions such as aggressive braking, excessive shock, excessive idling, APU power low, overheating, unit damage, and/or battery or device failure. In some embodiments, the systems 500, 550 may further include an ability to set and/or otherwise define 'Operation Hours' for a given trailer and/or tractor unit, and alerts may be set for operation activity occurring outside the defined 'Operation Hours'. In some cases, the systems 500, 550 may also monitor driver behaviors (e.g., driving patterns), real-time traffic data, weather information, road conditions, and/or other such factors that may be used to determine a desired stopover location, an optimal navigation route to the stopover location, and/or an estimated time of arrival (ETA) at the stopover location. For example, in some embodiments, one or more of the above features may be implemented in part using a vehicle navigation system (e.g., such as a GPS navigation system) on the tractor-trailer vehicles 160, where the navigation system incorporates the traffic data, weather information, road conditions, etc. to determine the route and ETA to the stopover location. While some examples of various features provided by the systems 400, 450 have been provided, those skilled in the art in possession of the present disclosure will recognize other features that may be implemented, while remaining within the scope of the present disclosure.

Variations and Other Embodiments

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A method for crowdsourcing vehicle operating parameters, the method comprising:
   receiving, at a network-connected service platform, brake-specific fuel consumption (BSFC) type data used during over-the-road travel for each vehicle, of a plurality of communicatively coupled vehicles having fuel-fed engines;
   identifying, by the network-connected service platform, selected BSFC type data for a particular vehicle, of the plurality of communicatively coupled vehicles, based on a correspondence of a fuel-fed engine configuration of a received-from vehicle, of the plurality of communicatively coupled vehicles, that has communicated BSFC type data to the network-connected service platform, with a fuel-fed engine configuration of the particular vehicle of the plurality of communicatively coupled vehicles; and
   disseminating, by the network-connected service platform, the selected BSFC type data to the particular vehicle.

2. The method of claim 1, further comprising:
   determining fuel-fed engine configuration correspondences using signatures based on information retrieved via respective on-vehicle controller area network interfaces.

3. The method of claim 1, wherein each vehicle, of communicatively coupled vehicles, includes an electric drive axle configured to supplement a primary source of motive torque, and
   wherein an electric drive controller on the each vehicle, of communicatively coupled vehicles is configured to apply an equivalent consumption minimization strategy (ECMS) using the BSFC type data to characterize efficiency of the fuel-fed engine with which the electric drive axle is paired in the through-the-road (TTR) hybrid configuration.

4. The method of claim 1, further comprising:
   identifying additional vehicle operating conditions associated with the received BSFC type data, the additional vehicle operating conditions including one or more of:
   (i) a geoposition, a regional location, or route for the received-from vehicle;
   (ii) weather or climatic data for the received-from vehicle; and
   (iii) an engine or vehicle load characteristic for the received-from vehicle.

5. The method of claim 4, further comprising:
   determining fuel-fed engine configuration correspondences based on the additional vehicle operating conditions.

6. The method of claim 1, wherein the receiving the BSFC type data and the disseminating the selected BSFC type data further comprises:
   communicating the received BSFC type data and the disseminated selected via mobile data communication interfaces.

7. A system comprising:
   a network-connected service platform that at least partially hosts an information store of brake-specific fuel consumption (BSFC) type data for particular fuel-fed engines;
   a plurality of vehicles each having an electric drive axle configured to supplement, in a through-the-road (TTR) hybrid configuration, motive torque provided by a respective fuel-fed engine and primary drivetrain, and each having an electric drive controller with a mobile data communication interface by which the electric drive controller communicates with the network-connected service platform;
   the network-connected service platform configured to:
   receive, from at least some of the plurality of vehicles, brake-specific fuel consumption (BSFC) type data determined or refined based on on-vehicle measurements during over-the-road travel for the fuel-fed engine of the respective, received-from vehicle,
   identify selected BSFC type data for a particular vehicle, of the plurality of vehicles, based on a correspondence of a fuel-fed engine configuration of a received-from vehicle, of the plurality of vehicles, that has communicated BSFC type data to the network-connected service platform, with a fuel-fed engine configuration of the particular vehicle of the plurality of communicatively coupled vehicles, and
   supply, to at least some of the plurality of vehicles, BSFC type data for adaptation of an equivalent consumption minimization strategy (ECMS) to characteristics of the fuel-fed engine of the respective, supplied-to vehicles.

8. The system of claim 7, wherein correspondence of the received and supplied BSFC type data with particular fuel-fed engine configurations is maintained using signatures derived or ascertainable from information retrieved by respective electric drive controllers via respective on-vehicle controller area network interfaces.

9. The system of claim 8, wherein the on-vehicle controller area network interfaces include J1939 interfaces by which the respective electric drive controllers are coupled to engine control modules of the respective fuel-fed engines with which they are currently paired in the TTR hybrid configuration.

10. The system of claim 9, wherein the electric drive controllers are configured to:
retrieve, via the respective on-vehicle controller area network interfaces, signatures indicative of the fuel-fed engines with which they are currently paired.

11. The system of claim 10, wherein the electric drive controllers are further configured to:
retrieve, via the mobile data communications interfaces and based on the indicative signatures, BSFC type data for the fuel-fed engines with which they are currently paired.

12. The system of claim 10, wherein
the electric drive controllers are further configured to provide, via the respective mobile data communications interfaces thereof, both
(i) BSFC type data computed based on parameters collected on-vehicle for over-the-road operation of the fuel-fed engines with which they are currently paired, and
(ii) the respective indicative signatures.

13. The system of claim 12, wherein the collected parameters include one or more of:
load, fuel usage and engine rpm retrieved, for particular fuel-fed engines, via the respective on-vehicle controller area network interfaces, and wherein, based on the parameters collected, the respective on-vehicle electric drive controller refines the BSFC type data set for ECMS application on-vehicle and for dissemination, via the network-connected service platform, to other vehicles having a similar fuel-fed engine configuration.

14. The system of claim 7, wherein the electric drive controller of at least some of the vehicles is adapted to the respective fuel-fed engine with which the electric drive axle is paired based on crowdsourced BSFC type data supplied to the respective electric drive controller via the network-connected service platform.

15. The system of claim 14, wherein the crowdsourced BSFC type data, once retrieved, adapts operation of the controller and electric drive axle to the fuel-fed engine of the respective vehicle configuration.

16. The system of claim 7, wherein a first one of the plurality of vehicles initially includes a trailer coupled to a first tractor unit that provides a first fuel-fed engine, wherein the first vehicle is configured to retrieve crowdsourced BSFC type data for a second fuel-fed engine different from the first fuel-fed engine after decoupling from the first tractor unit and instead coupling to a second tractor unit that include the second fuel-fed engine.

17. The system of claim 16, wherein the crowdsourced BSFC type data, once retrieved, adapts operation of the controller and electric drive axle to the fuel-fed engine of the second tractor-trailer vehicle configuration.

18. The system of claim 7, further comprising:
an energy store on each of the vehicles, the respective energy stores configured to supply the respective electric drive axles with electrical power in a first mode of operation and further configured to receive energy recovered using the respective electric drive axle in a second mode of operation.

19. The system of claim 7, wherein the BSFC type data includes one or more of:
a machine readable encoding of multi-dimensional data characterizing efficiency of a corresponding fuel-fed engine as a function of at least engine torque related measure and an engine speed related measure;
a machine readable encoding of BSFC curves or surfaces; and
a machine readable encoding of data derivative of either or both of the foregoing.

20. The system of claim 7, wherein at least some the vehicles include:
a tractor unit having the respective fuel-fed engine, primary drivetrain, electric drive axle and electric drive controller therefor.

21. The system of claim 7, wherein at least some the vehicles include:
a tractor unit having the respective fuel-fed engine and primary drivetrain; and
a trailer having the respective electric drive axle and electric drive controller therefor.

* * * * *